United States Patent Office 3,282,628
Patented Nov. 1, 1966

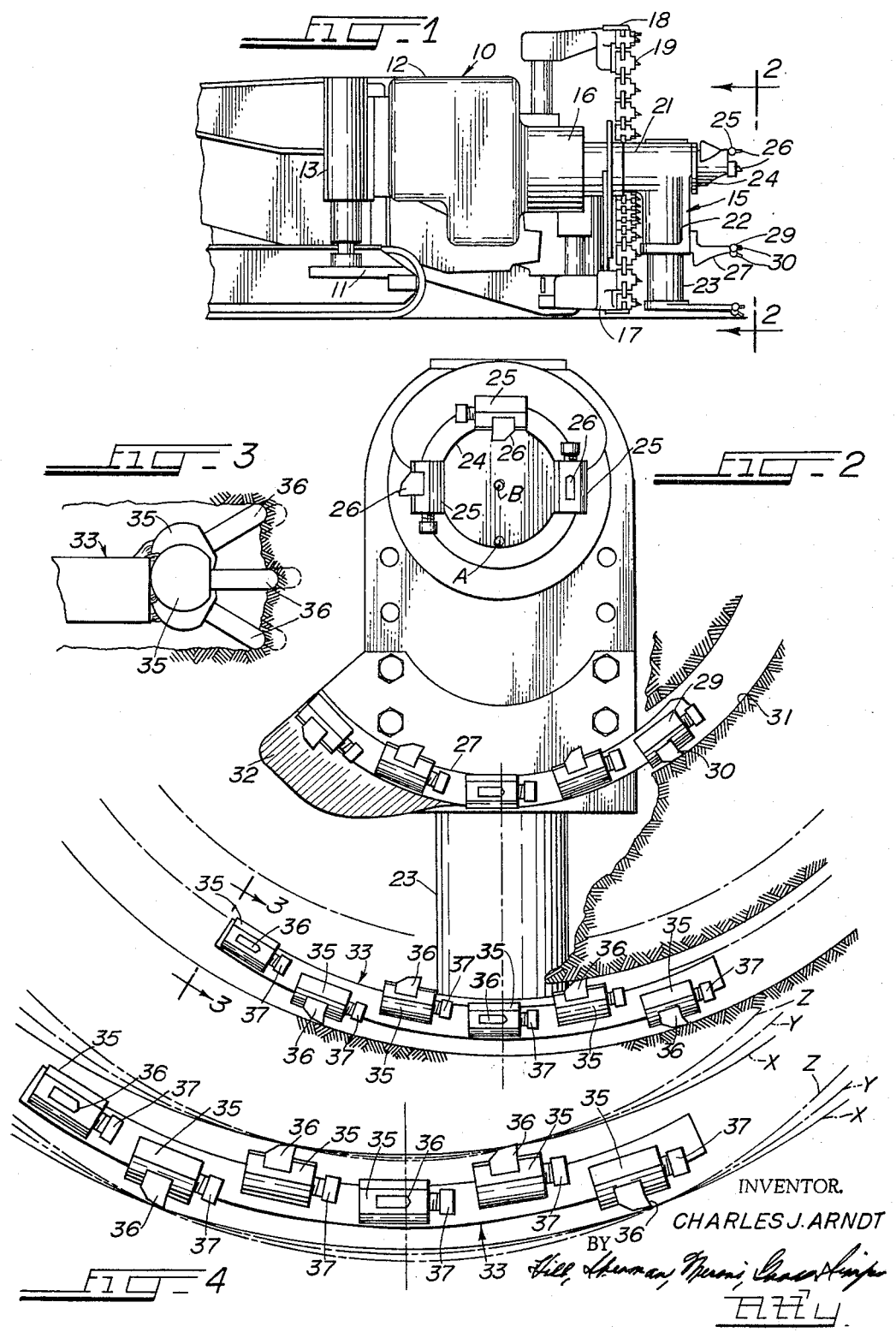

3,282,628
ADJUSTABLE BORING HEAD FOR
CONTINUOUS MINER
Charles J. Arndt, Harvey, Ill., assignor to Goodman
Manufacturing Company, Chicago, Ill., a corporation
of Illinois
Filed Dec. 26, 1963, Ser. No. 333,432
1 Claim. (Cl. 299—80)

This invention relates to improvements in boring heads for continuous mining machines and more particularly relates to such heads as are adjustable to cut at various cutting diameters.

In continuous mining machines of the boring type, two or more rotary boring heads are mounted on a gear box or cutter frame of the machine and project forwardly therefrom to cut contiguous bores in a mine face extending from the mine floor to the mine roof.

The cutting diameters of the boring heads are usually adjusted by adjusting the radial length of the boring arms and raising or lowering the cutter frame to conform to a selected diameter of cutting.

In accordance with present practices of continuous mining by driving contiguous bores in the mine face, the boring heads have usually consisted in a hollow drive shaft having at least one radial arm projecting radially therefrom. The radial arm has a telescopic arm mounted for extensible and retractible movement with respect thereto to adjust a cutter support projecting forwardly therefrom to the required cutting diameter. The center of rotation of the boring arm is then adjusted by adjustable movement of the cutter frame to position the outer adjustable cutter support to make a circular bore from the mine roof to the mine floor in which the outer margins of the circular bore are substantially tangent to the mine roof and the mine floor.

The cutter supports have usually been formed to conform to a maximum cutting diameter, and when the cutting diameter has been changed, the cutter bits have been positioned to cut at different cutting diameters for the same positions of bits. The leading bits of a group of bits of the same positions also have been gauged to make a deeper cut than the trailing bits with the result that a bulk of the cutting is done by the leading bits, and coring frequently occurs and the bit supporting blocks rub on the kerf walls and cores, resulting in an inefficient cutting operation, requiring an excessive amount of power and excessive wear on the cutter blocks and their supports as well as on the leading bits.

A principal object of the present invention is to provide an improved form of adjustable boring head and cutter support for a continuous mining machine, supporting the bits to cut at the same cutting gauge and so supporting the cutter bits that all bits of like positions will cut at the same cutting diameter for all positions of adjustment of the boring head.

Another object of the present invention is to provide an adjustable boring head for continuous mining machines in which coring and rubbing of the cutter bit supporting blocks on the kerf walls and cores is reduced by so supporting the cutter bits that all bits of like positions will cut at the same cutting diameters for each position of adjustment of the boring head and the cutting gauges of the leading and trailing cutter bits will be set to penetrate equal amounts, with the cutting patterns arranged to position the next trailing bits to cut in non-repetitive orbits with respect to the next adjacent leading bits.

A still further object of the invention is to provide a radially adjustable boring head for boring types of miners having a telescopic boring arm having a cutter support projecting forwardly therefrom, in which the cutter support is formed to conform to a mean cutting diameter and circumferential path, and in which the cutter blocks and bits are mounted on the cutter support to cut at the same cutting gauge and at the same cutting diameters for the same cutting positions, and in non-repetitive cutting paths.

These and other objects of the invention will appear from time to time as the following specification proceeds and with reference to the accompanying drawing wherein:

FIGURE 1 is a fragmentary view in side elevation of the forward end portion of a continuous mining machine of the boring type;

FIGURE 2 is a front end view of an adjustable boring head constructed in accordance with the principles of the present invention;

FIGURE 3 is a view looking at the trailing end portion of the outer cutter support, substantially along line 3—3 of FIGURE 2; and FIGURE 4 is an enlarged fragmentary front end view of the adjustable cutter support illustrating the circumferential cutting paths of the cutter bits for the various positions of adjustment of the boring head.

In FIGURE 1 of the drawings I have diagrammatically shown the front end portion of a continuous mining machine 10 of the boring type having a mobile base or main frame 11 having a gear housing or cutter frame structure 12 adjustably supported on the forward end of said main frame by parallel spaced elevating jacks 13, and extending in advance of said main frame and forming a support for a pair of laterally spaced rotary boring heads 15. Each boring head 15 is rotatably supported in a hub 16, extending forwardly of the cutter frame structure 12 and is vertically moved in accordance with the cutting diameter of the boring head by operation of the front elevating jacks 13. The cutter frame structure is also supported and tilted to conform the boring head to the ground by rear tilting jacks (not shown) in a conventional manner.

The rotary boring head is of a form well known to those skilled in the art and generally includes a hollow drive shaft 21 having at least one hollow arm 22 extending radially therefrom, having a telescopic arm 23 slidably mounted therein for telescopic adjustable movement with respect thereto in a conventional manner. The telescopic arm 23 is adjustably moved by power and held in fixed relation with respect to the axis of rotation of the boring head in a well known manner, which is no part of the present invention so need not herein be shown or described in detail.

The hollow shaft 21, radial arm 22 and telescopic arm 23 are also rotatably driven by a suitable motor (not shown) through reduction gearing contained within the cutter frame structure 12 in a conventional manner, which is no part of the present invention so need not herein be shown or described further.

The boring head 15 has a central pilot cutter support 24 supporting a series of cutter blocks 25 carrying cutter bits 26 serving to make a pilot cut closely adjacent the axis of rotation of the boring head.

The radial boring arm 22 also has a tool holder or cutter support 27 extending along its outer end portion. The cutter support 27 conforms generally to an arc struck from the axis of rotation of the boring head and has a series of cutter blocks 29 mounted thereon and projecting forwardly therefrom. The cutter blocks 29 carry the usual cutter bits 30 positioned to cut clearance for opposite sides of the cutter support 27 and arranged in non-repetitive cutting paths to cut an annular kerf 31 in the mine face, the outer wall of which is wedged down by a trailing wedging surface 32 extending radially outwardly of the trailing end portion of said cutter support.

The telescopic arm 23 is shown as having a tool holder or cutter support 33 extending forwardly therefrom and carrying forwardly projecting cutter blocks 35 forming holders for cutter bits 36 held thereto at the required cutting gauge by set screws 37.

Referring now in particular to the outer cutter support 33, this cutter support when looking at the forward end of the support toward the cutter blocks 35 and cutter bits 36, is in the general form of an arc, conforming generally to the intermediate cutting diameter of the mining head, the center of the arc of which cutter support is struck from the axis of rotation of the mining head when vertically adjusted in accordance with the intermediate cutting diameter of the head, to position the cutting positions of the outermost cutter bits to cut tangentially of the mine floor and the mine roof, as they move along the floor and roof of the mine. The center of the arc of the cutter support 33 is indicated by point A in FIGURE 2. The center of rotation of the boring head when the boring head is in the extended position is indicated by point B. Point A is spaced from point B along the longitudinal axis of the radial arm 22 an amount equal to the distance the axis of rotation of the boring head is lowered to position the outermost cutter bits to cut tangentially of the floor and roof of the mine when the boring head is in an intermediate cutting position.

As shown in FIGURES 2, 3, and 4, a trailing bit 36 at the trailing end of the cutter support 33 is shown as being a center of the kerf at a preselected cutting gauge, depending upon the width of the kerf to be cut. A next forwardly spaced bit 36 is shown as cutting along the outer kerf wall to define the outermost diameter of the kerf. This bit is set at the same cutting gauge as the center cutter bit. The next forwardly spaced cutter bit 36 is shown as cutting along the inner kerf wall. In FIGURE 3, the dotted line positions of the bits indicate the advance of the bits for a cycle of rotation thereof equal to the length of the cutter support and attained by the advance of the entire machine into the working face, as the mining heads are rotatably driven.

FIGURE 4 is an enlarged end view of the outer cutter support 33 and shows the next leading bit from the bits just mentioned as being positioned to cut substantially along center, with the bit in advance of this bit positioned to cut radially inwardly of center and the bit in advance of this bit or leading bit of the cutter bits, carried by the cutter support, positioned to cut radially outwardly of center. It may be seen from this figure that the bit pattern is such that the cutting pattern of the next trailing cutting bits will not be repetitive of the cutting pattern of the next preceding leading bits throughout the length of the cutter support.

The inner and outer solid lines X of FIGURE 4 indicate the inner and outer circumferential cutting paths of the inwardly and outwardly inclined cutter bits 36 for the maximum cutting diameter of the boring head. The two radially spaced inner and outer broken lines Y indicate the inner and outer cutting paths of the inwardly and outwardly inclined cutter bits 36, when the cutter support is adjusted for cutting in an intermediate cutting position. The two radially spaced inner and outer broken lines Z, Z indicate the cutting paths of the inwardly and outwardly inclined cutter bits 36, when the cutter support 33 is adjusted into its minimum cutting position.

It may be seen from lines X, Y, and Z that the cutter bits 36 cut clearance for the cutter support or tool holder 33, and the cutter bit supporting blocks mounted thereon, and that the tool holder 33 and cutter bit supporting blocks 35 support their respective cutter bits 36 so that all cutter bits of like positions cut at the same cutting diameter for all positions of adjustment of the boring head, and therefore are positioned to cut clearance for themselves and for their cutter supports when cutting various diameters of kerfs, without coring or binding against the kerf walls.

While I have herein shown and described one form in which the invention may be embodied, it may readily be understood that various variations and modifications in the invention may be attained without departing from the spirit and scope of the novel concepts thereof.

I claim as my invention:

In a continuous mining machine, a mobile main frame, a cutter frame mounted on said main frame for vertical adjustable movement with respect thereto, a rotary boring arm supported on said cutter frame and extending in advance thereof and rotatably driven about an axis extending longitudinally of said main frame, said rotary boring arm including a rotatably driven shaft, a radial arm extending radially of said shaft, a telescopic arm telescopically movable with respect to said radial arm to effect adjustment of the cutting diameter of said boring head, a cutter support on the outer end of said telescopic arm and extending forwardly therefrom and being formed on an arc in end view, conforming to the arc of rotation of said cutter support in a mean position of adjustment of said cutter support, and struck from an axis extending through the center of rotation of said boring head and along said radial arm, and spaced from the center of rotation of said boring head a distance equal to the vertical adjustable movement of the axis of said boring head required to position said cutter support to cut tangentially of the ground, a plurality of circumferentially spaced cutter blocks mounted on said cutter support and conforming generally to the arc of travel of said cutter support and having cutter bits mounted thereon and projecting forwardly therefrom at the same cutting gauge, said cutter blocks being positioned to extend angularly of said cutter support to each side of the center of said cutter support and to extend in generally centered relation with respect to said cutter support and each cutter block having bit holding means accessible from an end of the cutter block, said cutter blocks being spaced sufficient distances apart to afford access to said bit holding means and supporting said cutter bits at the same cutting depth to cut in non-repetitive cutting patterns with all bits of like cutting positions cutting at the same cutting diameter in all positions of adjustment of said boring head.

References Cited by the Examiner

UNITED STATES PATENTS

| 2,765,156 | 10/1956 | Cartlidge | 299—80 |
| 2,766,028 | 10/1956 | Plant | 299—61 X |
| 2,955,810 | 10/1960 | McWhorter et al. | 299—90 |
| 3,014,706 | 12/1961 | Newton | 299—90 X |

ERNEST R. PURSER, *Primary Examiner.*